(12) United States Patent
Werner

(10) Patent No.: US 6,499,731 B2
(45) Date of Patent: Dec. 31, 2002

(54) HIGH SPEED PUSHER APPARATUS FOR SHEET FEEDERS

(76) Inventor: Todd C. Werner, 3360 Scherer Dr., St. Petersburg, FL (US) 33716

( * ) Notice: Subject to any disclaimer, the term of this patent is extended or adjusted under 35 U.S.C. 154(b) by 19 days.

(21) Appl. No.: 09/681,073

(22) Filed: Dec. 20, 2000

(65) Prior Publication Data

US 2002/0074707 A1 Jun. 20, 2002

(51) Int. Cl.$^7$ .......................... B65B 25/14; B65G 19/00
(52) U.S. Cl. .................... 270/58.06; 198/728; 198/732; 198/735.1; 53/252; 53/284.3; 414/790.3
(58) Field of Search .................. 270/58.06; 53/252, 53/284.3; 414/790.3; 198/605, 612, 468.9, 468.11, 469, 728, 732, 733, 735.1

(56) References Cited

U.S. PATENT DOCUMENTS

| | | | | |
|---|---|---|---|---|
| 3,059,391 A | * | 10/1962 | Volks et al. ............. | 270/58.06 |
| 3,770,263 A | * | 11/1973 | Parups et al. ............ | 270/58.06 |
| 4,525,986 A | * | 7/1985 | Noll ........................... | 53/252 |
| 4,649,691 A | * | 3/1987 | Buckholz ................... | 53/284.3 |
| 5,125,214 A | * | 6/1992 | Orsinger et al. ........... | 53/284.3 |
| 5,165,523 A | * | 11/1992 | Wooley et al. .............. | 198/731 |
| 5,964,461 A | * | 10/1999 | Ende et al. ................. | 198/732 |
| 6,164,046 A | * | 12/2000 | Werner et al. ............. | 53/284.3 |
| 6,237,746 B1 | * | 5/2001 | Sussmeier ................... | 198/728 |

* cited by examiner

Primary Examiner—Christopher P. Ellis
Assistant Examiner—Patrick Mackey
(74) Attorney, Agent, or Firm—Ronald E. Smith; Smith & Hopen, PA

(57) ABSTRACT

A high speed sheet feeder machine includes at least one pusher that follows a loop-shaped path of travel as the machine operates. The pusher pushes an insert into an envelope during a forward and downward part of its path of travel and then retreats rearwardly and upwardly along the loop-shaped path of travel before repeating an insertion. In this way, the pusher makes no abrupt changes in its path of travel. Very high rates of insertion are made possible by providing multiple pushers at longitudinally spaced apart intervals along the loop-shaped path of travel. A stop plate is integrally formed with each pusher assembly and a fixed position barrier is mounted on the machine adjacent the rearward end of the loop-shaped path of travel to prevent over-rotation of each pusher member at very high speeds.

5 Claims, 5 Drawing Sheets

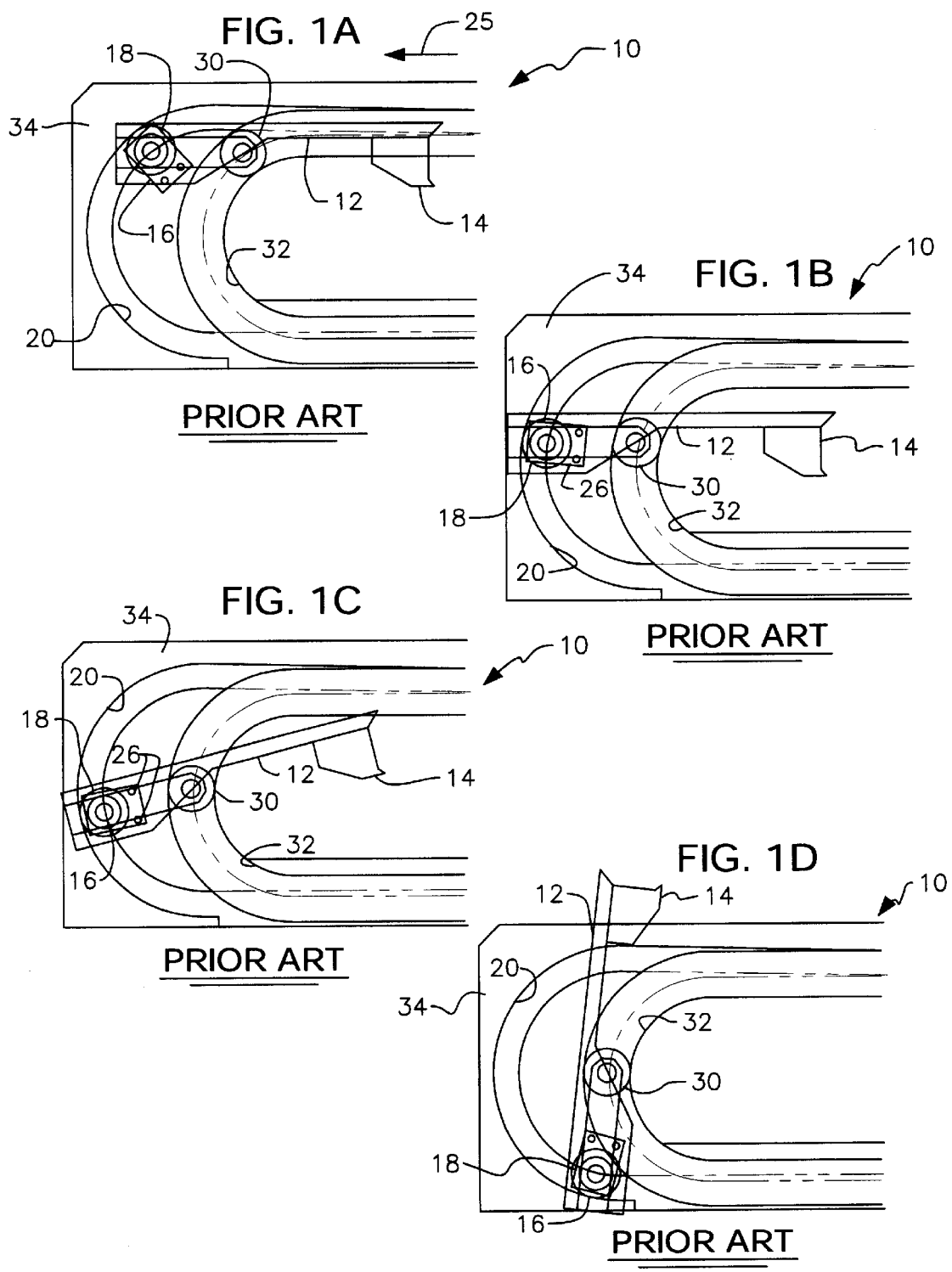

HIGH SPEED PUSHER APPARATUS FOR SHEET FEEDERS

BACKGROUND OF THE INVENTION

This invention relates, generally, to high speed sheet feeder machines, also known as inserters. More particularly, it relates to an apparatus that prevents over-rotation of a pusher apparatus for an inserter when operated at very high speeds.

High speed inserters have pusher members that follow a predetermined path of travel in the form of a loop that lies in a vertical plane so that they can reciprocate without stopping and without having abrupt changes in direction. The pushers push sheets into envelopes when said pushers are in a forward position at the lower elevation of the loop. They retreat along the higher elevation of the loop to a rearward position after each insertion and then travel forwardly again to the forward position and the cycle endlessly repeats for as long as the machine is in operation. Some high speed machines can insert ten thousand sheets per hour into envelopes, but that speed seems to be an upper limit. At such high speeds, the momentum of the pushers causes the respective leading ends or heads of the pushers to swing out of their normal path of travel in a rearward bight region of the loop where the rearward-to-forward change in direction occurs. Once out of position, they lose their operability and the machine has to be shut down to re-position the pusher members.

The respective trailing ends of the pusher members are rotatably mounted on a transversely disposed rod that follows the loop-shaped path of travel. If the rod is well oiled and the friction between the trailing end of each pusher member and the rod is very low, the pusher member will not usually rotate out of its operable position at speeds below ten thousand insertions per hour. However, the friction between the rod and the trailing end gradually increases as the machine operates, with the result that pusher member rotation eventually occurs. At speeds above ten thousand insertions per hour, the pusher members rotate out of position even when the rod is well-oiled.

It should be understood that each transversely disposed rod typically carries three pushers in equidistantly, laterally spaced relation to one another. Moreover, there may be three or four transverse rods per machine, equidistantly and longitudinally spaced apart from one another along the extent of the loop-shaped path of travel.

The obvious solution to the problem is to run the machines at a speed that does not cause the pusher members to depart from their normal path, and to frequently oil the rod that carries the trailing end of the pusher members. That is not an acceptable solution, however, when there is a demand for insertions in excess of ten thousand per hour and where time requirements do not allow for frequent shut-downs for oiling.

In view of the prior art in at the time the present invention was made, it was not obvious to those of ordinary skill in the pertinent art how a pusher assembly could be built that could operate at speeds in excess of twelve thousand insertions per hour.

SUMMARY OF THE INVENTION

The longstanding but heretofore unfulfilled need for an inserter machine capable of operating at speeds in excess of ten thousand sheet insertions per hour is now met by a new, useful, and nonobvious apparatus for enabling high speed travel of a pusher apparatus. A groove that follows a loop-shaped path of travel is formed in opposing, transversely spaced apart vertical walls of the push member assembly. A transversely disposed rod extends between the opposing vertical walls and the trailing end of each pusher is rotatably mounted thereto but the opposing ends of the transversely disposed rod do not directly engage the opposing grooves. Instead, a pair of carriage members rotatably engage the transversely disposed rod at its opposite ends, there being one carriage member at each end of the transversely disposed rod. Each carriage member has a truncate longitudinal extent and has a transversely offset roller rotatably mounted at its leading end. The roller is disposed in and travels about its associated groove. The longitudinally extending part of the carriage rotatably engages the transversely disposed rod. The transversely disposed rod is connected at its opposite ends to chains that define the loop-shaped path of travel of the pushers.

An upstanding stop member is formed in the trailing end of the carriage member.

A stationary flat barrier plate is mounted to the trailing end of each side wall of the pusher assembly. Accordingly, each flat barrier plate is disposed just rearwardly (a sixteenth of an inch or so) of the rearward bight region of the loop-shaped path of travel. The stop member at the trailing end of each carriage slidingly abuts the flat barrier plate as the carriage negotiates the bight region at the rearward end of the loop-shaped path of travel, and such abutment prevents rotation of said at least one pusher, relative to the transversely disposed rod upon which it is mounted, even at speeds in excess of ten thousand insertions per hour.

The primary object of this invention is to provide an improved pusher apparatus that enables a high speed sheet feeder to operate at speeds in excess of ten thousand insertions per hour.

A more specific object is to accomplish the foregoing object by means of an apparatus that can be retrofit onto existing machines.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 1A is the first figure in a five step animation depicting a pusher member of the prior art as it follows its path of travel at a very high speed;

FIG. 1B is the second figure in said five step animation;

FIG. 1C is the third figure in said five step animation;

FIG. 1D is the fourth figure in said five step animation;

DETAILED DESCRIPTION

Referring initially to FIG. 1A, it will there be seen that the reference number 10 denotes a prior art embodiment of a pusher apparatus. In FIG. 1A, pusher 12 has entered the rearward bight region of its loop-shaped path of travel and is approaching the rearwardmost point of said path of travel. Pusher 12 has a head 14 at its leading end; said head has a mass that causes it to rotate out of its operable position at high speeds, due to inertial forces generated by the change in direction in said rearward bight region.

Figure 5A:
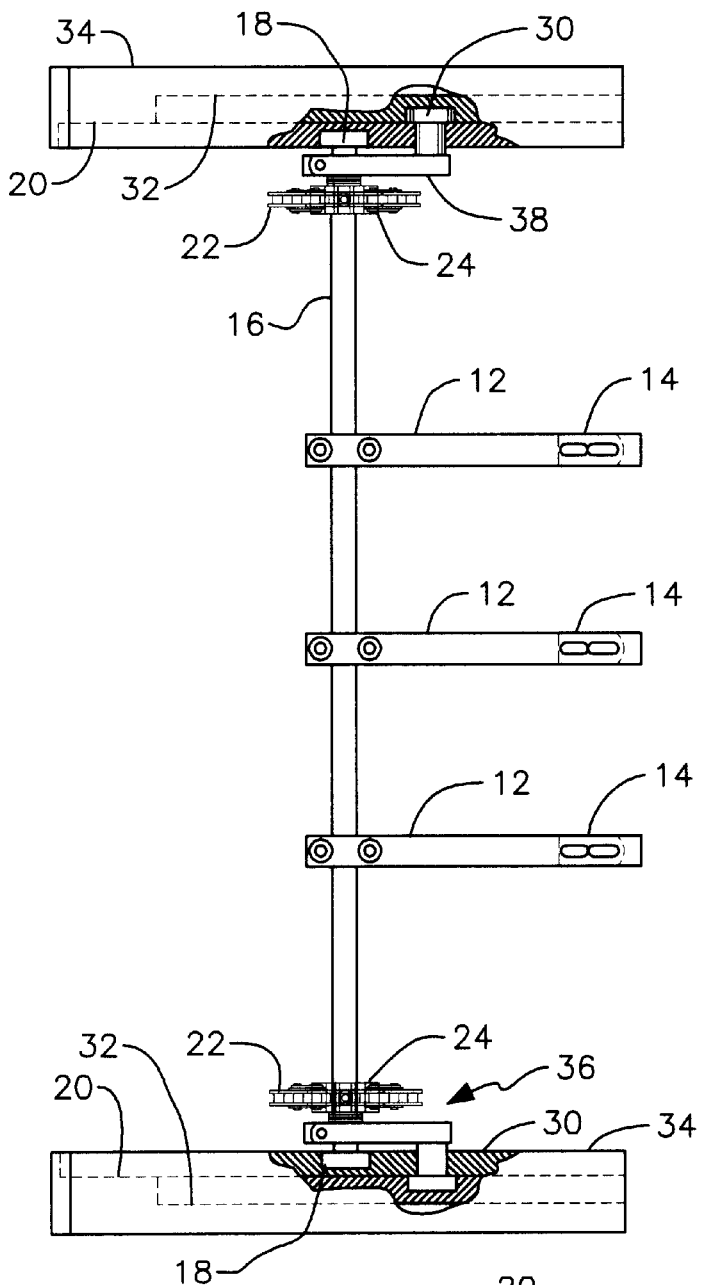
FIG. 5A is a top plan view of the trailing end of a pusher assembly.
Figure 5B:
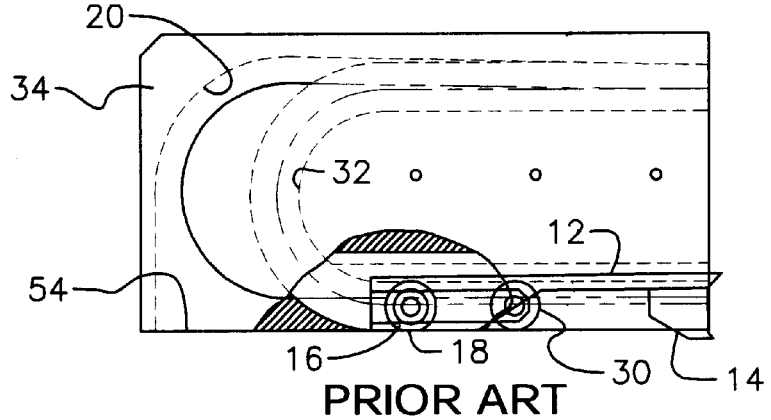
FIG. 5B is a side elevational view of said trailing end of said pusher assembly.

It should be understood that there are a plurality of pushers behind the illustrated pusher in the side view of FIG. 1, and that all of said pushers are mounted on transversely disposed rod 16. A roller 18 is mounted on each end of transverse rod 16 and that roller is guided around the rearwardmost bend by an upraised shoulder 20. FIG. 5A provides a top plan view that illustrates the plurality of pushers disposed along the extent of said transverse rod 16.

Figure 1E:
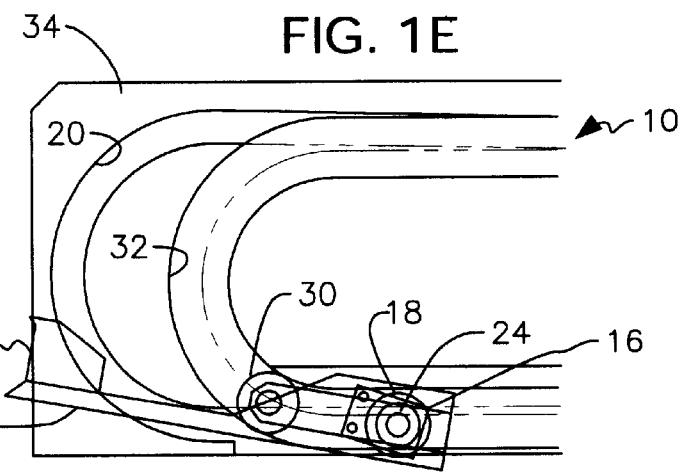
FIG. 1E is the fifth figure in said five step animation.
Figure 2A:
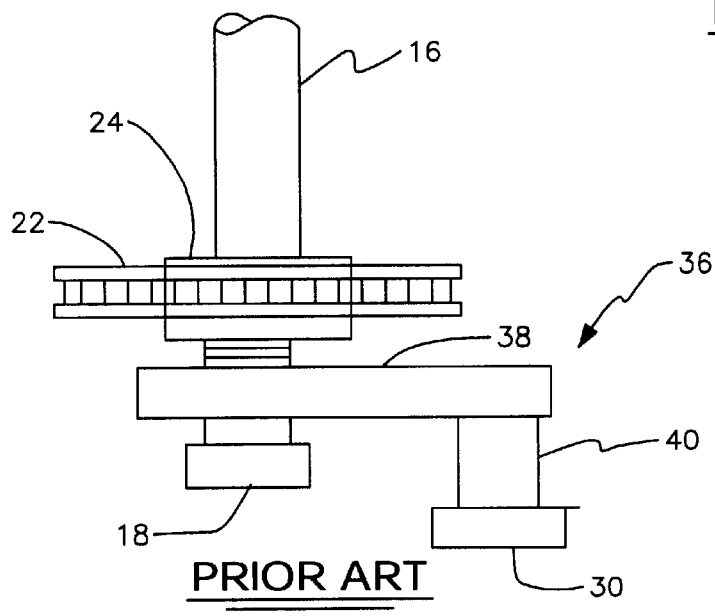
FIG. 2A is a top plan view of a carriage member of the prior art.
Figure 2B:
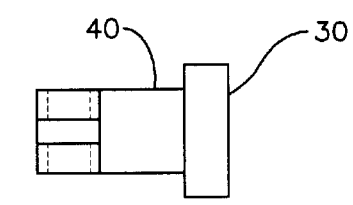
FIG. 2B is a side elevational view thereof.
Figure 2C:
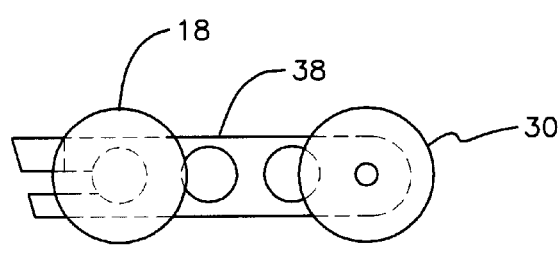
FIG. 2C is an end view thereof.

Transversely disposed rod 16 follows a loop-shaped path of travel defined by sprocket chain 22 (see FIGS. 2A–C). Bracket 24 interconnects rod 16 to chain 22. Specifically, bracket 24 has a throughbore formed in a base thereof that receives said rod 16 and said bracket further includes a neck part that extends from the base within which is formed a pair of openings, collectively denoted 26 (see FIGS. 1B and 1C). Each opening of said pair of openings slideably receives a pin that engages a link of chain 22. In this way, rotation of chain 22 carries each pusher 12 along its loop-shaped path of travel.

It should be understood that another chain 22 just like sprocket chain 22 is engaged to an opposite end of transversely disposed rod 16 by a second bracket 24, as depicted in FIG. 5A.

Chain 22 carries each pusher 12 to a sheet insertion station at the leading end, not shown, of said chain. After pushing a sheet into an envelope, each pusher 12 retreats to the rearwardmost end of the path of travel of the chain as indicated by directional arrow 25 (FIG. 1A) and then returns to the sheet insertion station as indicated by directional arrow 27 (FIG. 1E).

Typically, there are three laterally spaced pushers 12 mounted on each transverse rod 16, as illustrated in FIG. 5A, and there are four transverse rods 18 spaced equidistantly along the extent of chain 22. In this way, there are four insertions of sheets into envelopes for each rotation of the chain. For a more complete understanding of the environment of each pusher 12, see U.S. patent application Ser. No. 09/250,459 to the present inventor, filed Feb. 16, 1999, entitled High Speed Machine For Inserting Sheets Into Envelopes, the disclosure of which is hereby incorporated hereinto by reference.

As best understood in connection with FIGS. 2A–C, a second roller 30 is positioned in leading relation to roller 18. It rides in groove 32 (FIGS. 1A–E), there being a groove 32 formed in each of the parallel, vertically disposed, transversely spaced apart, longitudinally extending sidewalls that provide the mounting means for the pusher apparatus. Reference numeral 34 denotes a vertical sidewall in FIGS. 1A–1E and FIG. 5B and both vertical side walls 34, 34 are depicted in FIG. 5A. Second roller 30 is connected to first roller 18 by a carriage 36 that includes a longitudinally extending part 38 and a transversely disposed part 40. Roller 30 is transversely offset from roller 18 in outboard relation thereto as depicted in FIGS. 2A and 5A, because said roller 30 is fully received within groove 32 formed in sidewall 34 as aforesaid, whereas roller 18 is not received with such a groove. Roller 18, as mentioned earlier, is guided through the rearward bight region by upraised shoulder 20.

Note in FIGS. 3A–3E that pusher 12 of the present invention remains in the same position as it completes its reciprocating path of travel. However, as is understood in connection with FIGS. 1A–E, the prior art apparatus of said FIGS. 1A–1E cannot maintain the pusher in said position at high speeds.

More particularly, as indicated in FIGS. 1A and 1B, which depict a pusher 12 entering into the rearward bight region of the path of travel of the chain, the position of such pusher remains unaffected during the beginning of such entry phase. This is because the pusher is traveling in a rearward direction as it enters the curved bight region at the rearward extent of the path of travel of the chain. However, at FIG. 1C, transversely disposed rod 16 and hence roller 18 have begun their forward travel and roller 30 has not. This causes head 14 of pusher 12 to rotate upwardly under its own momentum as illustrated. Specifically, the trailing end of pusher 12 rotates relative to transversely disposed rod 16. At FIG. 1D, roller 30 may have begun its forward travel as well, but roller 18 is much further into its forward travel phase and as a result, head 14 has rotated even further upwardly. FIG. 1E shows the culmination of this process; head 14 is completely out of position by the time it completes its rearward turn and remains in said nonfunctional position when it reaches the forward (toward the sheet insertion station) part of the path of travel. Thus, it will not be in an operable position when it reaches said sheet insertion station at the leading end of the pusher assembly. A machine operator will have to stop the machine, manually re-position pusher 12, and slow down the speed of the sheet feeder to a speed where the pusher no longer flips over.

FIGS. 3A–E, as mentioned earlier, depict a pusher member 12 that remains in its operable position throughout its entire path of travel, even when the sheet feeder machine is operating at speeds in excess of ten thousand insertions per hour.

Figure 3A:
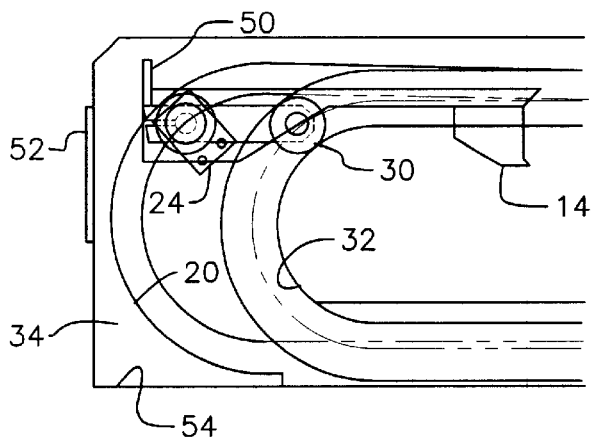
FIG. 3A is the first figure in a five step animation depicting a pusher member of the present invention as it follows its path of travel at a very high speed.
Figure 3B:
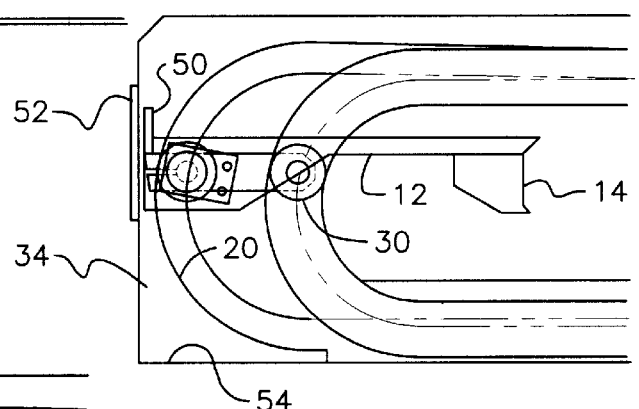
FIG. 3B is the second figure in said five step animation.
Figure 3C:
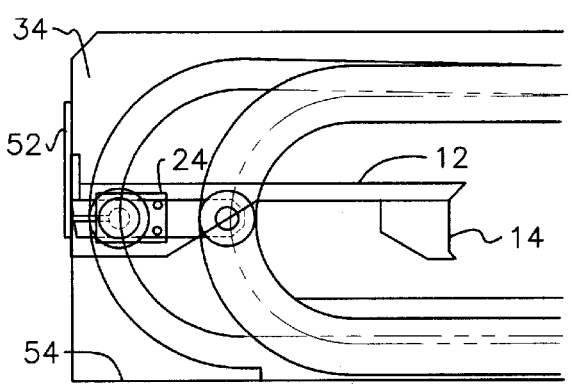
FIG. 3C is the third figure in said five step animation.
Figure 3D:
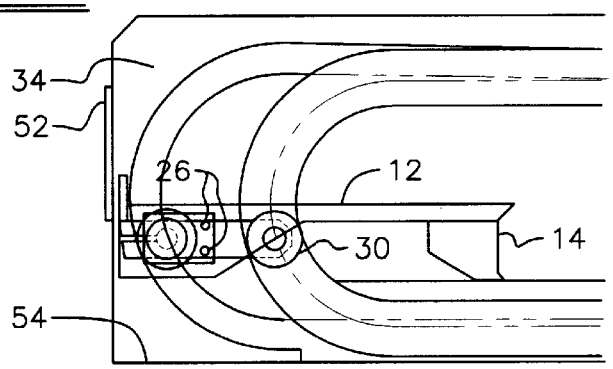
FIG. 3D is the fourth figure in said five step animation.
Figure 3E:
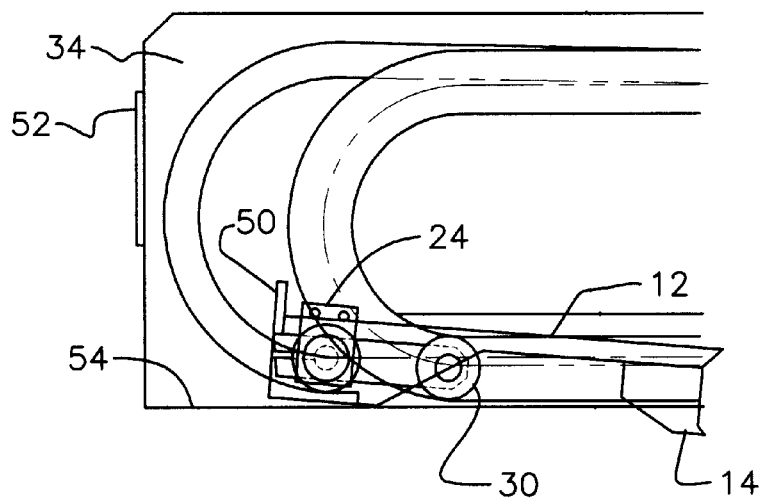
FIG. 3E is the fifth figure in said five step animation.

The apparatus that enables the pusher to follow the path of travel depicted in FIGS. 3A–E includes an upstanding stop member 50 formed integrally with the trailing end of carriage member 36, and a flat plate or barrier means 52 mounted at the rearward end of sidewall 34. Stop member 50 slidingly abuts against flat plate 52 as pusher 12 undergoes the change of direction at the rearward end of the pusher assembly, as depicted in FIGS. 3B–D. Such sliding abutment prevents rotation of pusher 12. Note that pusher 12 in FIG. 3E is in its operable position as it travels toward the sheet insertion station. Head 14 of pusher 12 is below the lowermost edge of sidewall 34 because a groove is formed in support surface 54 upon which said sidewall 34 is mounted. The sheets to be inserted, not shown, are supported atop support surface 34; the groove enables head 14 to engage such sheets from below.

Figure 4A:
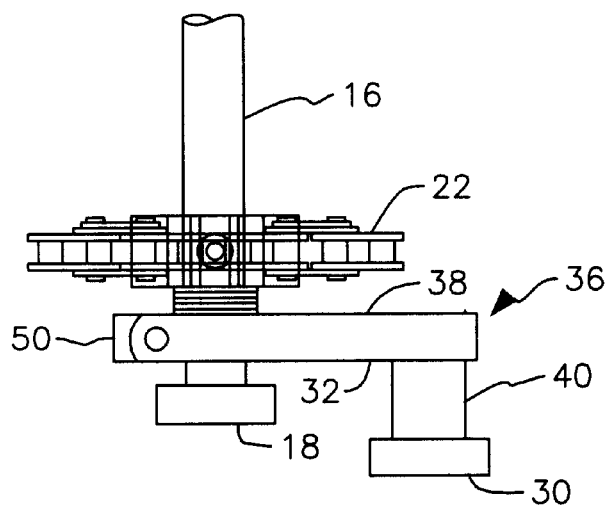
FIG. 4A is a top plan view of the novel carriage member.
Figure 4C:
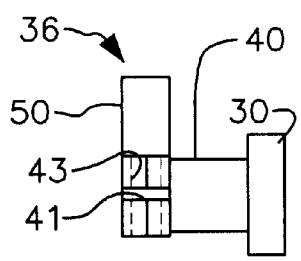
FIG. 4C is an end view thereof.
Figure 4B:
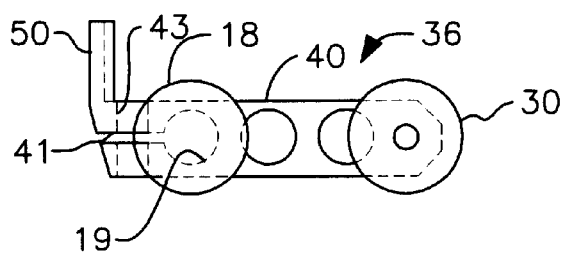
FIG. 4B is a side elevational view thereof.

Central aperture 19 (FIG. 4B) in roller 18 accommodates transversely disposed rod 16. The space formed by slot 41 in the trailing end of carriage 36 is decreased when a bolt, not shown, is extended through bore 43 and tightened. Such tightening clamps carriage 36 onto transversely disposed rod 16 so that said two parts move in unison with one another, there being no slippage therebetween. In this way, flat plate 52 prevents rotation of stop member 50 and stop member 50 prevents rotation of pusher 12. A machine equipped with the novel anti-rotation means of FIGS. 3A–E can operate at sheet insertion speeds up to eighteen thousand insertions per hour.

It will be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. An apparatus for maintaining a pusher in a high speed sheet feeder machine in a substantially nonrotated position, comprising: a pair of parallel, longitudinally disposed, transversely spaced apart sidewalls having a forward end and a rearward end; a sheet insertion station disposed adjacent said forward end of said sidewalls; a first continuous chain that follows a loop-shaped path of travel between a forward end and a rearward end of a first sidewall of said pair of sidewalls; a second continuous chain that follows a loop-shaped path of travel between a forward end and a rearward end of a second sidewall of said pair of sidewalls; said loop-shaped path of travel including a forward bight region, a rearward bight region, and a pair of vertically spaced apart straight sections extending between said forward and rearward bight regions; a transversely disposed rod that extends between said sidewalls; first interconnecting means for interconnecting said transversely disposed rod and said first chain; second interconnecting means for interconnecting said transversely disposed rod and said second chain; at least one pusher for sequentially inserting sheets into envelopes, said at least one pusher being longitudinally disposed; said at least one pusher having a head at a forward, leading end thereof, said head adapted to abuttingly engage and insert a sheet into an envelope at said sheet insertion station; a trailing end of said at least one pusher being rotatably engaged to said transversely disposed rod at a preselected point between said first and second chains; said at least one pusher traveling rearwardly from said sheet insertion station to a rearwardmost position where said trailing end of said pusher is substantially coincident with a rearwardmost end of said first and second sidewalls, and said at least one pusher traveling forwardly from said rearwardmost position to said sheet insertion station as said first and second continuous chains follow said loop-shaped path of travel; a guide means for guiding said transversely disposed rod about said loop-shaped path of travel; a first carriage member having a trailing end nonrotatably engaged to a first end of said transversely disposed rod; a second carriage member having a trailing end nonrotatably engaged to a second end of said transversely disposed rod; a first barrier means secured to a rearward end of said first sidewall; a second barrier means secured to a rearward end of said second sidewall; an upstanding stop member disposed at a trailing end of each of said carriage members; said upstanding stop members slidingly engaging their associated barrier means when said trailing end of said at least one pusher traverses said rearward bight region; whereby said at least one pusher maintains its substantially nonrotated position throughout its path of travel.

2. The apparatus of claim 1, wherein said first interconnecting means is a first bracket having a first end that nonrotatably engages said transversely disposed rod and a second end that engages said first chain and wherein said second interconnecting means is a second bracket having a first end that nonrotatably engages said transversely disposed rod and a second end that engages said second chain, said first and second brackets being disposed at opposite ends of said transversely disposed rod.

3. The apparatus of claim 2, wherein said first carriage member further includes a first transversely offset roller at its leading end, wherein said second carriage member includes a second transversely offset roller at its leading end, and wherein said guide means includes a first loop-shaped groove formed in said first sidewall and a second loop-shaped groove formed in said second sidewall, said first and second loop-shaped grooves receiving said first and second transversely offset rollers of said first and second carriage members, respectively.

4. The apparatus of claim 3, further comprising: a first roller rotatably engaged to a first end of said transversely disposed rod and a second roller rotatably engaged to a second end of said transversely disposed rod; a first raised shoulder formed in said first sidewall at said rearward end thereof; a second raised shoulder formed in said second sidewall at said rearward end thereof; said first and second raised shoulders guiding said first and second rollers as they traverse said bight at said rearward end of said first and second sidewalls.

5. The apparatus of claim 4, wherein a curvature of said first and second shoulders is substantially equal to a curvature of said grooves at said rearward end of said loop-shaped grooves and where a longitudinal spacing between a center of said first and second rollers and a center of said first and second transversely offset rollers is preselected so that said first and second rollers bear against said first and second shoulders when said first and second transversely offset rollers are traversing said first and second bight regions at the rearward end of said first and second sidewalls, respectively.

\* \* \* \* \*